Patented Oct. 16, 1934

1,977,146

UNITED STATES PATENT OFFICE 1,977,146

PROCESS FOR BREAKING PETROLEUM EMULSIONS

Claudius H. M. Roberts, San Marino, Calif., assignor to Tretolite Company, Webster Groves, Mo., a corporation of Missouri No Drawing. Application August 3, 1933, Serial No. 683,479

21 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of my invention is to provide a novel and inexpensive process for separating emulsions of the character referred to into their component parts of oil and water or brine.

Briefly described, my process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedure.

The treating agent used in my process consists of a substituted polyhydric alcohol of the kind obtained when a polyhydric alcohol or derivative thereof is partially or completely esterified by the replacement of one or more of the alcoholiform hydroxyls by one or more polybasic carboxy acid residues or derivatives thereof, and furthermore, either the polyhydric alcohol residue or the polybasic carboxy residue, or both, must be chemically united to a ricinoleic acid body. Ricinoleic acid bodies are materials of the kind which occur in castor oil and are derived from castor oil. Ricinoleic acid bodies include the ricinoleic acid itself and its various glycerides, such as monoricinolein, diricinolein, and triricinolein. Castor oil consists substantially of triricinolein. Hydrogenated castor oil, as well as oxidized or chlorinated castor oil may be considered as a suitable example of the ricinoleic acid body. Castor oil may be subjected to the Twitchell process to yield a suitable material. Castor oil may be subjected to sulfation and subsequently to hydrolysis to yield suitable materials, such as dihydroxy-stearic acid. Ricinoleic acid may be heated to yield various ester acids or to yield various poly-ricinoleic acids, which are equally suitable. These materials are typical of a class which are derived from ricinoleic acids or its glycerides and are fluid at ordinary temperatures, and they are characterized by the presence of a reactive alcoholiform hydroxyl, and will be referred to as ricinoleic acid bodies.

Since ricinoleic acid bodies must necessarily enter into the composition of the reagent contemplated in the present process, it is desirable to point out that ricinoleic acid may enter into combination in two different ways. The carboxylic hydrogen of ricinoleic acid may combine with a hydroxyl of a polyhydric alcohol of the kind to be described, and another hydroxyl of said polyhydric alcohol may combine with the polybasic carboxy acid residue. Likewise, the alcoholiform hydroxyl of ricinoleic acid or any ricinoleic acid body may combine with a polybasic carboxy acid residue to produce an ester in which there has been substituted for the hydroxyl of the ricinoleic acid a polybasic carboxy acid residue, and furthermore, this substituent polybasic carboxy acid residue has been also united with a polyhydric alcohol or derivative thereof. Indeed, one might contemplate a compound derived from ricinoleic acid in which reactions involved both the carboxylic hydrogen and the alcoholiform hydroxyl. It is desirable to point out that the compounds herein contemplated, which are obtained by reactions involving the replacement of the alcoholiform hydroxyl by a complex residue of the polybasic acid and polyhydric alcohol type, are a variety of modified fatty acids of the kind contemplated by U. S. Patent No. 1,467,831 to William S. Barnickel, dated September 11, 1923.

The most desirable ricinoleic acid body for use in preparation of the reagent employed in the present process is castor oil, because it is the cheapest and has every desirable physical property. Since castor oil is a glyceride, and since there is no acid carboxy hydrogen, it can only enter into reactions, of the kind required to produce the reagent contemplated in the present process, by reactions involving the alcoholiform hydroxyl. I have found that reactions involving the alcoholiform hydroxyl produce the most valuable reagents for use in the process described.

In co-pending application of DeGroote et al., Serial No. 664,210, filed April 3, 1933, there is described another reagent for use in a similar process, which reagent is also a modified fatty acid, but is produced solely from ricinoleic acid bodies or the like and polybasic carboxy acids and does not contemplate the presence in the reagent of a polyhydric alcohol residue, as in the reagent of the present process.

As has been previously pointed out, the reagents contemplated in the present process are members of a broad class of reagents described in my co-pending application Serial No. 665,962, filed April 13, 1933, which contemplates certain substituted alcohols in the sense that the word "substituted" is employed in said co-pending application and also in this present one, produced by any suitable reaction, and is characterized by the composition of the product itself. Where the polyhydric alcohol is united directly to an acidic hydrocarbon derivative, such as stearic acid, it is considered as a polyhydric alcohol derivative, even though the acidic hydrocarbon derivative may have been combined therewith subsequent to the reaction of the polyhydric alcohol with the polybasic carboxy acid. Similarly, where the polybasic carboxy acid is united directly to a basic hydrocarbon derivative, such as cetyl alcohol, it is considered as a polyhydric alcohol derivative, even though the basic hydrocarbon derivative may have been combined therewith subsequent to reaction of the polybasic carboxy acid with the polyhydric alcohol. In still other cases, where the hydrocarbon derivative contains both acidic and basic groups, as in hydroxystearic acid, this may be suitably linked both to the polyhydric alcohol and to the polybasic carboxy acid, either before or after reaction between said polyhydric alcohol and polybasic carboxy acid.

The present application contemplates the use of a reagent of the kind described for resolving water-in-oil emulsions. Said reagent is a chemical combination of a ricinoleic acid body and a polyhydric alcohol-polybasic carboxy acid condensation product. The available ricinoleic acid body materials are relatively few and simple. The polyhydric alcohol-polybasic carboxy acid compounds are more complex and variable, and often it is most convenient to produce these materials first, and then subsequently combine them with a ricinoleic acid body of the kind described to give the reagent employed in the present process. Hence, it is necessary to give an adequate description of the polyhydric alcohol-polybasic acid compound.

One may denote a polyhydric alcohol by the formula $R(OH)_n$, in which $n$ represents the numeral two or more; a polybasic carboxy acid may be denoted by the formula $A(COOH)_n$, in which $n$ represents the numeral two or more. The reaction products may be of the type $(R'A')_m$, in which a polyhydric alcohol is combined completely with a polybasic carboxy acid of the same valence, and $m$ is one or more. $R'A'(COOH)_m$ may be employed to indicate the reaction product, in which a polyhydric alcohol combines with a polybasic acid having greater valence, such as a dihydric alcohol with a tricarboxy acid, and $m$ represents the numeral one or more. Likewise, the formula $R'A'(OH)_m$ represents a compound of the type where a polyhydric alcohol is reacted with a polybasic acid of lesser valence, as a reaction between glycerol and phthalic acid. The formula $R'A'(OH)_m(COOH)_m$ indicates a product obtained by reaction between a polyhydric alcohol and a polycarboxy acid of the same valence, in which only partial neutralization takes place. The letter $m$ has the same significance as before. Obviously, incomplete neutralization may take place in reactions involving polyhydric alcohols and polybasic carboxy acids of dissimilar valence. Likewise, reactions may continue between compounds of the type $R'A'(COOH)_m$ and $R'A'(OH)_m$. Either one of these compounds just mentioned may react with an amphoteric type compound $R'A'(OH)_m(COOH)_m$. Likewise, the acidic group indicated in the formula by $(COOH)_m$ may combine with any reactive material, such as another molecule of the polyhydric alcohol indicated by the formula $R(OH)_m$ or a monohydric alcohol, such as ethyl alcohol, isopropyl alcohol, cetyl alcohol, benzoyl alcohol, trimethyl carbinol, cyclohexanol, methyl-cyclopentanol, furfur-alcohol, etc. Likewise, the basic hydroxyl in the formulas may combine with additional molecules of the polybasic carboxy acid $A(COOH)_m$, or it may combine with a monobasic acid, such as acetic acid, butyric acid, oleic acid, stearic acid, benzoic acid, cinnamic acid, picolinic acid, cyclohexane carboxylic acid, etc.

It is obvious, where reactions take place between polyhydric alcohols and polybasic carboxy acids, that if one obtains a compound of the type previously designated $$R'A'(OH)_m(COOH)_m,$$

that said material can combine with itself to produce long chain or cyclic compounds characterized by the fact that although the compound contains the groups $(OH)_m$ and $(COOH)_m$, $R'A'$ 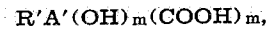 must be indicated as $(R'A')_n$, in which $n$ has the prior significance of two or more, and the polymerized product thus obtained is indicated by the formula $(OH)_m(R'A')_n(COOH)_m$. If such reaction is permitted to continue indefinitely, that is, until $n$ becomes a relatively large number, one obtains a substance of very large molecular weight, having the properties of a resin, that is, insoluble in oil and water, even after neutralization of the residual carboxyl or hydroxyl, and furthermore, the materials are substantially solids in nature. In the instances where $n$ is a relatively small number, for instance, less than 10, the product thus obtained has characteristics intermediate between the simplest neutral product obtained by complete reaction involving a dihydric alcohol plus a dibasic carboxy acid, and a substantially solid, insoluble type, resinic product. I shall refer to these materials intermediate between the simplest products and resinic products as resin intermediates, and designate them by the formula $$(OH)_m(R'A')_n(COOH)_m,$$ 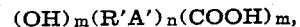

where $m$ indicates the numeral one or more and $n$ indicates the numeral two or more.

It is understood from the description of the reactions above described that one is not limited to the use of the polyhydric alcohols and the polybasic carboxy acids, but that one may also employ simple derivatives, which do not change the basic or acidic properties. For instance, a halogen derivative of glycol or glycerol, such as chloroglycerol, would be as effective as the unaltered polyhydric alcohol. Likewise, chlorophthalic acid, or a similar modification of citric acid, etc., would be as suitable as the unaltered polybasic carboxy acid. The anhydrides are just as suitable for use as the acids themselves.

As indicated in my said co-pending application Serial No. 665,962, above referred to, desirable compounds are obtained by uniting a material of the kind previously indicated, for instance, a basic type, such as $R'A'(OH)_m$ with a long chain acidic body, particularly a carboxy long chain compound, such as oleic acid, stearic acid, linolic acid, etc. Instead of a fatty carboxy acid one may employ a petroleum carboxy acid, such as naphthenic acid, or a rosin carboxy acid, such as abietic. Likewise, the material thus employed need not be of the carboxy type, but may owe its acidity to the presence of a sulfo group, a nitro group, or a phosphoric acid group or radical, etc. Thus, one could employ oleic acid hydrogen sulfate, or the fatty acid sulfate obtained from the equivalent glyceride which is free from carboxylic hydrogen. Likewise, one may employ fatty sulfonic acids or petroleum sulfonic acids. Said petroleum sulfonic acids may be of the water-soluble type or of the oil-soluble type.

Also, as stated in said application, equally valuable products may be obtained by reaction between an acid material of the type mentioned, such as $R'A'(COOH)_m$ and a long chain material of basic characteristics, such as hydroxystearic acid, ricinoleic acid, cetyl alcohol, etc. The reactions indicated, forming either the acidic or the basic type product, are also suitable for the production of compounds forming the amphoteric type, which I have indicated as $R'A'(OH)_m(COOH)_m$ and also

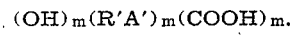
$(OH)_m(R'A')_m(COOH)_m$.

In making reagents of these types, involving such long chain compounds as hydroxystearic acid, it is understood that the acidic hydrogen, such as the hydrogen of the carboxyl, or the hydrogen of a sulfonic group, may be replaced by various acid hydrogen equivalents previously indicated, so as to produce acids, salts, esters, amine salts, amine derivatives, etc. It is also obvious that various reagents may be oil-soluble, whereas, others may be water-soluble. Some may exhibit both oil and water solubility.

The commonest reaction of inorganic chemistry is the reaction involving an acid and a base resulting in the formation of a salt and water, and generally referred to as neutralization. When the base is organic in nature, that is, an alcohol, the reaction product is known as an ester, and the process, instead of being referred to as neutralization, is referred to as esterification. Esterification is in essence the reverse of hydrolysis. Thus, the products obtained for use in my process for treating emulsified oil are obtained by the partial or complete esterification of a polyhydric alcohol and proper combination with a ricinoleic acid body or by equivalent reaction with other suitable reagents. Such products are generally referred to as products of esterification. They are not substitution products in the conventional sense employed in organic chemistry. Substitution, as generally employed in organic chemistry, means the replacement of one or more of the atoms of an organic radical, usually a hydrocarbon radical, by a substituent atom or radical. It is to be noted that the reagents employed in my process are obtained from polyhydric alcohols by replacing the alcoholiform hydroxyl radical, and not by replacing a hydrogen of the organic radical. Likewise, the replacement of the acid hydrogen atom of an organic carboxy acid is not substitution. If the hydrogen of an organic radical is replaced, as in the case of chloroglycerol, such a material may be used, but it does not constitute a treating agent of the kind contemplated until the alcoholiform hydroxyl group is replaced. Having pointed out that I am using the word "substituted" in a peculiar sense, and not in its general meaning, I will refer to the reagents employed in my process, for the sake of simplicity, as substituted polyhydric alcohols further characterized by combination with ricinoleic acid bodies. Various polyhydric alcohols may be employed. They may be aliphatic, aromatic, cyclic, aralkyl, heterocyclic, etc. Suitable polyhydric alcohols include ethylene glycol, glycerol, erythritol, adonitol, mannitol, dihydroxy-naphthalene, alizarin, purpurin, terpin, dihydroxy-thiophene, ethyl trihydroxy-palmitate, ethyl trihydroxy-chlorpalmitate, etc.

Likewise, one may employ various polybasic carboxy acids, including those of the aromatic type, alkyl type, aralkyl type, cyclic type, heterocyclic type, etc. Suitable examples, including those previously pointed out, are succinic, maleic, malic, aconitic, tartaric, citric, fumaric, tricarballylic, trihydroxy-glutaric, mesoxalic, phthalic, diphenic, naphthalic, benzoyl-benzoic, trimesic, mellitic, cinchomaronic, quinolinic, camphoric, aspartic, norpinic, glutamic, etc. In addition, the polyhydroxy phenols, which are amphoteric in nature, such as catechol, resorcinol, quinol, pyrogallol, hexahydro-phenol, etc., may be employed as and are equivalent to polybasic carboxy acids when caused to react with more basic substances or are equivalent to polyhydric alcohols when caused to react with more acidic substances than themselves.

One may employ the acids or alcohols themselves or their derivatives, such as halogen derivatives, etc., provided that the materials still exhibit the desired acidic or basic character. Likewise, in employing the various monobasic alcohols, or monobasic acids, one may employ the materials themselves or their derivatives, such as chloroleic acid, etc., provided that these derivatives still exhibit the desired acidic or basic character. For the sake of unity and simplicity, I prefer to designate polyhydric alcohols and their derivatives and polybasic acids and their derivatives, of the kinds described, as polyhydric alcohol bodies and polybasic acid bodies, respectively.

The present invention is differentiated from the broad class which has been previously described in great detail, in that a ricinoleic acid body must always enter into combination to produce the final reagent, and thus in the present process one cannot employ reagents derived from oleic acid, naphthenic acid, stearic acids, etc., but one must employ a ricinoleic acid body of the kind described. Furthermore, the co-pending application referred to includes simpler reagents derived solely from a polyhydric alcohol and a polybasic acid, without the inclusion of a long chain hydrocarbon-like material, such as ricinoleic acid, stearic acid, etc. In producing the reagent employed in the present process one may employ any polybasic carboxy acid of the kind described in my co-pending application for the acid equivalent, such as oxalic acid, and one may employ any polyhydric alcohol of the kind described in my co-pending application; for the basic equivalent. I prefer to use phthalic acid or phthalic anhydride in combination with glycerol and castor oil.

Castor oil, which I contemplate as a raw material for preparing reagents to be employed in the present process, consisting of tri-ricinolein, is not reactive toward an alcohol (thus being distinguished from oleic acid, stearic acid and the like) but is reactive toward an acid, such as polybasic carboxy acids including phthalic acid etc., only by virtue of the alcoholiform hydroxyl attached to the fatty hydrocarbon chain. For this reason it is apparent that stearic acid, oleic acid, linolic acid, palmitic acid, etc. or their esters, are not the equivalent of ricinoleic acid or its ester, such as the glyceride of ricinoleic acid for producing reagents contemplated in the present process. The former class of unhydroxylated fatty materials do not have a reactive alcoholiform hydroxyl in the hydrocarbon chain and thus they cannot produce reagents of the type wherein the alcoholiform hydroxyl of the fatty hydrocarbon chain combines with a polybasic carboxy acid, and is replaced by a polybasic carboxy acid residue which in turn is united with a polyhydric alcohol residue. Since the reaction of the ricinoleic acid body must take place by virtue of the alcoholiform hydroxyl, the reaction involving the ricinoleic acid body must always be by combination with the polybasic carboxy acid or its residue and cannot be by combination with another alcoholiform hydroxyl, such as one of the hydroxyls of the polyhydric alcohol since such a mixture is non-reactive. Castor oil, being free from acid hydrogens, as distinguished from oleic acid and the like can only react by virtue of the alcoholiform hydroxyl, that is, with an acid.

In the reaction products above described the hydrogen of the carboxyl is indicated in the conventional manner as H, representing an acidic hydrogen atom. Obviously, the acidic hydrogen can be replaced by any equivalent. Such acidic material may be treated with a suitable alkaline material, such as caustic soda, caustic potash, ammonium hydroxide, calcium hydroxide, magnesium hydroxide, etc., so as to produce the corresponding metallic salts, many of which are water-soluble. Basic amines, such as triethanolamine, may be employed for neutralization. The acidic hydrogen may be combined with an alcohol of any kind, as previously stated, to produce an ester. The acidic hydrogen may remain unneutralized. The hydroxyl of the carboxyl may be combined with an amine by eliminating a hydrogen of the amine with the separation of a molecule of water. Water-soluble salts of the kind previously referred to may be reacted with metallic water-soluble salts, such as copper salts, iron salts, aluminum salts, zinc salts, magnesium salts, etc. to produce salts of the respective metals by metathesis. Reagents contemplated in the present process may be oil-soluble or water-soluble, or soluble in both oil and water. In some instances, the reagent appears to be almost insoluble in either oil or water, except in the very dilute proportions in which it is actually used. In many instances a coarse dispersion is just as satisfactory as a molecular solution of the reagent.

Without reference to the reactions involved, which have been explained very completely, one may simply follow the following directions for producing a suitable reagent for use in my process: Mix 296 lbs. of phthalic anhydride with 92 lbs. of glycerol, and heat for approximately five to ten minutes at approximately 125° C. to 150° C., until a thin, clear, water-white liquid resin intermediate, containing no unreacted phthalic anhydride, has been produced. With the resin intermediate is then mixed 312 lbs. of castor oil and the mixture is heated to from 150° to 250° C., for approximately ten to thirty minutes, after which it is permitted to cool and is diluted with from ten to fifty percent of denatured alcohol. The compound is then ready for use or may first be saponified, using concentrated ammonium hydroxide.

The materials previously described need not be employed alone, as a demulsifying agent, but may be employed in conjunction with other suitable demulsifiers, such as water softeners, modified fatty acids, oil-soluble or water-soluble petroleum sulfonic acids, substituted aromatic sulfonic acids, dialkyl sulfo acids, substituted amine acidic bodies, etc., or the salts and esters of the same or the like. One may add any suitable inert solvent or solvents to the reagent contemplated, particularly solvents which would lower the viscosity of the product and make it more adaptable for use, such as kerosene, solvent naphtha, cresol, pine oil, ethyl alcohol, butyl alcohol, benzol, denatured alcohol, propyl alcohol, etc.

In practising my process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced, introducing the treating agent into a conduit through which the emulsion is flowing, introducing the treating agent into a tank in which the emulsion is stored, or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions. such as homogenizers, hay tanks, gun barrels, filters, centrifuges, or electrical dehydrators.

The amount of treating agent on the anhydrous basis that is required to break the emulsion may vary from approximately 1 part of treating agent to 1500 parts of emulsion, up to a ratio of 1 part of treating agent to 30,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 10,000 parts of emulsion will usually be found to produce commercially satisfactory results.

Having thus described my invention, what I claim as new and desire to secure by Letters Patent is:

1. A process for breaking a petroleum emulsion of the water-in-oil type, which consists in subjecting the emulsion to the action of a demulsifying agent comprising a substituted polyhydric alcohol body, in which at least one alcoholiform hydroxyl has been replaced by a polybasic carboxy acid body residue, and furthermore, characterized by chemical combination with a ricinoleic acid body, by reaction involving the alcoholiform hydroxyl of the ricinoleic acid body and a carboxylic hydrogen of the polybasic carboxy acid residue.

2. A process for breaking a petroleum emulsion of the water-in-oil type, which consists in subjecting the emulsion to the action of a demulsifying agent comprising a substituted polyhydric alcohol, in which at least one alcoholiform hydroxyl has been replaced by a polybasic carboxy acid body residue, and furthermore, characterized by chemical combination with a ricinoleic acid body, by reaction involving the alcoholiform hydroxyl of the recinoleic acid body and a carboxylic hydrogen of the polybasic carboxy acid residue.

3. A process for breaking a petroleum emulsion of the water-in-oil type, which consists in subjecting the emulsion to the action of a demulsifying agent comprising a substituted trihydric alcohol body, in which at least one alcoholiform hydroxyl has been replaced by a polybasic carboxy acid body residue, and furthermore, characterized by chemical combination with a recinoleic acid body, by reaction involving the alcoholiform hydroxyl of the ricinoleic acid body and a carboxylic hydrogen of the polybasic carboxy acid residue.

4. A process for breaking a petroleum emulsion of the water-in-oil type, which consists in subjecting the emulsion to the action of a demulsifying agent comprising a substituted trihydric alcohol, in which at least one alcoholiform hydroxyl has been replaced by a polybasic carboxy acid body residue, and furthermore, characterized by chemical combination with a ricinoleic acid body, by reaction involving the alcoholiform hydroxyl of the ricinoleic acid body and a carboxylic hydrogen of the polybasic carboxy acid residue.

5. A process for breaking a petroleum emulsion of the water-in-oil type, which consists in subjecting the emulsion to the action of a demulsifying agent comprising a substituted polyhydric alcohol body, in which at least one alcoholiform hydroxyl has been replaced by a dibasic carboxy acid body residue, and furthermore, characterized by chemical combination with a ricinoleic acid body, by reaction involving the alcoholiform hydroxyl of the ricinoleic acid body and a carboxylic hydrogen of the dibasic carboxy acid residue.

6. A process for breaking a petroleum emulsion of the water-in-oil type, which consists in subjecting the emulsion to the action of a demulsifying agent comprising a substituted trihydric alcohol body, in which at least one alcoholiform hydroxyl has been replaced by a dibasic carboxy acid body residue, and furthermore, characterized by chemical combination with a ricinoleic acid body, by reaction involving the alcoholiform hydroxyl of the ricinoleic acid body, and a carboxylic hydrogen of the dibasic carboxy acid residue.

7. A process for breaking a petroleum emulsion of the water-in-oil type, which consists in subjecting the emulsion to the action of a demulsifying agent comprising a substituted polyhydric alcohol body, in which at least one alcoholiform hydroxyl has been replaced by a polybasic carboxy acid body residue, and furthermore, characterized by chemical combination with castor oil by reaction involving a carboxylic hydrogen of the polybasic carboxy acid residue.

8. A process for breaking a petroleum emulsion of the water-in-oil type, which consists in subjecting the emulsion to the action of a demulsifying agent comprising a substituted trihydric alcohol body, in which at least one alcoholiform hydroxyl has been replaced by a polybasic carboxy acid body residue, and furthermore, characterized by chemical combination with castor oil by reaction involving a carboxylic hydrogen of the polybasic carboxy acid residue.

9. A process for breaking a petroleum emulsion of the water-in-oil type, which consists in subjecting the emulsion to the action of a demulsifying agent comprising a substituted polyhydric alcohol body, in which at least one alcoholiform hydroxyl has been replaced by a dibasic carboxy acid body residue, and furthermore, characterized by chemical combination with castor oil by reaction involving a carboxylic hydrogen of the dibasic carboxy acid residue.

10. A process for breaking a petroleum emulsion of the water-in-oil type, which consists in subjecting the emulsion to the action of a demulsifying agent comprising a substituted trihydric alcohol body, in which at least one alcoholiform hydroxyl has been replaced by a dibasic carboxy acid body residue, and furthermore, characterized by chemical combination with castor oil by reaction involving a carboxylic hydrogen of the dibasic carboxy acid residue.

11. A process for breaking a petroleum emulsion of the water-in-oil type, which consists in subjecting the emulsion to the action of a demulsifying agent comprising a substituted glycerol body, in which at least one alcoholiform hydroxyl has been replaced by a polybasic carboxy acid body residue, and furthermore, characterized by chemical combination with castor oil by reaction involving a carboxylic hydrogen of the polybasic carboxy acid residue.

12. A process for breaking a petroleum emulsion of the water-in-oil type, which consists in subjecting the emulsion to the action of a demulsifying agent comprising a substituted glycerol, in which at least one alcoholiform hydroxyl has been replaced by a polybasic carboxy acid body residue, and furthermore, characterized by chemical combination with castor oil by reaction involving a carboxylic hydrogen of the polybasic carboxy acid residue.

13. A process for breaking a petroleum emulsion of the water-in-oil type, which consists in subjecting the emulsion to the action of a demulsifying agent comprising a substituted polyhydric alcohol body, in which at least one alcoholiform hydroxyl has been replaced by a phthalic acid body residue, and furthermore, characterized by chemical combination with castor oil by reaction involving a carboxylic hydrogen of the phthalic acid residue.

14. A process for breaking a petroleum emulsion of the water-in-oil type, which consists in subjecting the emulsion to the action of a demulsifying agent comprising a substituted polyhydric alcohol body, in which at least one alcoholiform hydroxyl has been replaced by a phthalic acid residue, and furthermore, characterized by chemical combination with castor oil by reaction involving a carboxylic hydrogen of the phthalic acid residue.

15. A process for breaking a petroleum emulsion of the water-in-oil type, which consists in subjecting the emulsion to the action of a demulsifying agent comprising a substituted glycerol body, in which at least one alcoholiform hydroxyl has been replaced by a phthalic acid body residue, and furthermore, characterized by chemical combination with castor oil by reaction involving a carboxylic hydrogen of the phthalic acid residue.

16. A process for breaking a petroleum emulsion of the water-in-oil type, which consists in subjecting the emulsion to the action of a demulsifying agent comprising a substituted glycerol, in which at least one alcoholiform hydroxyl has been replaced by a phthalic acid body residue, and furthermore, characterized by chemical combination with castor oil by reaction involving a carboxylic hydrogen of the phthalic acid residue.

17. A process for breaking a petroleum emulsion of the water-in-oil type, which consists in subjecting the emulsion to the action of a demulsifying agent comprising a substituted glycerol, in which at least one alcoholiform hydroxyl has been replaced by a phthalic acid residue, and furthermore, characterized by chemical combination with castor oil by reaction involving a carboxylic hydrogen of the polybasic carboxy acid residue.

18. A process for breaking a petroleum emulsion of the water-in-oil type, which consists in subjecting the emulsion to the action of a demulsifying agent comprising a substituted polyhydric alcohol body derived from castor oil, phthalic anhydride and glycerol in chemical combination.

19. A process for breaking a petroleum emulsion of the water-in-oil type, which consists in subjecting the emulsion to the action of a demulsifying agent comprising a substituted polyhydric alcohol body derived from castor oil, phthalic anhydride and glycerol in chemical combination and partially saponified.

20. A process for breaking a petroleum emulsion of the water-in-oil type, which consists in subjecting the emulsion to the action of a demulsifying agent comprising a substituted polyhydric alcohol body derived from castor oil, phthalic anhydride and glycerol in chemical combination and partially saponified with ammonium hydroxide.

21. A process for breaking petroleum emulsions of the water-in-oil type, which consists in subjecting the emulsion to the action of a demulsifying agent comprising a substituted polyhydric alcohol body derived from castor oil, phthalic anhydride and glycerol in chemical combination, partially saponified with ammonium hydroxide and diluted with denatured alcohol.

CLAUDIUS H. M. ROBERTS.